United States Patent
Tseng (10) Patent No.: US 12,435,869 B2
(45) Date of Patent: Oct. 7, 2025

(54) WEARABLE OBJECT WITH LIGHT EMITTING DEVICE

(71) Applicant: Shen-Ko Tseng, Taipei (TW)

(72) Inventor: Shen-Ko Tseng, Taipei (TW)

( * ) Notice: Subject to any disclaimer, the term of this patent is extended or adjusted under 35 U.S.C. 154(b) by 114 days.

(21) Appl. No.: 18/394,112

(22) Filed: Dec. 22, 2023

(65) Prior Publication Data
US 2025/0207769 A1 Jun. 26, 2025

(51) Int. Cl.
*A43B 3/36* (2022.01)
*F21V 23/00* (2015.01)
*F21V 23/04* (2006.01)
*F21W 121/06* (2006.01)
*F21Y 113/00* (2016.01)
*F21Y 115/10* (2016.01)

(52) U.S. Cl.
CPC ............ *F21V 23/0471* (2013.01); *A43B 3/36* (2022.01); *F21V 23/001* (2013.01); *F21W 2121/06* (2013.01); *F21Y 2113/00* (2013.01); *F21Y 2115/10* (2016.08)

(58) Field of Classification Search
CPC ........ H05B 45/20; H05B 45/30; H05B 45/46; H05B 45/52; H05B 47/155; H05B 47/165; A43B 3/36; A43B 3/38; A43B 3/44
See application file for complete search history.

(56) References Cited

U.S. PATENT DOCUMENTS

| | | | | |
|---|---|---|---|---|
| 6,789,913 B2* | 9/2004 | Wei | ............................ | A43B 3/40 36/137 |
| 7,500,761 B2* | 3/2009 | Tseng | ........................ | A43B 3/36 362/249.14 |
| 8,087,801 B2* | 1/2012 | Tseng | ...................... | A43B 23/00 362/249.05 |
| 9,210,964 B2* | 12/2015 | Song | ......................... | A43B 3/36 |
| 9,763,309 B2* | 9/2017 | Tseng | ......................... | F21L 4/02 |
| 2007/0159110 A1* | 7/2007 | Weng | .................... | H05B 47/155 315/185 S |

* cited by examiner

*Primary Examiner* — Tung X Le
(74) *Attorney, Agent, or Firm* — Rosenberg, Klein & Lee (57) ABSTRACT

A wearable object includes a main body and a light emitting device. The main body includes a first containing space, a second containing space separated from the first containing space, and an elastic structure corresponding to the second containing space. The light emitting device includes a plurality of light emitting units, a controlling unit and a switch module. The controlling unit is disposed in the first containing space and connected to the light emitting units, and configured to drive the light emitting units to emit light. The switch module includes a first metal sheet and a contacting portion, and is configured in the second containing space and connected to the controlling unit. When the elastic structure is pressed toward the second containing space to cause the contacting portion to contact the first metal sheet, the switch module sends a controlling signal to the controlling unit.

28 Claims, 7 Drawing Sheets

WEARABLE OBJECT WITH LIGHT EMITTING DEVICE

BACKGROUND OF THE INVENTION

1. Field of the Invention

The present invention relates to a wearable object, especially to a wearable object with light emitting device.

2. Description of the Prior Art

With the popularity of miniaturized light sources in recent years, light emitting components have been commonly installed on non-electronic products, such as shoes, clothes, hats, backpacks, or any object that can be carried or worn. For example, a Light Emitting Device (LED) can be the miniaturized light source installed on the products. The form of the miniaturized light source configured on a portable object has not only a safety warning function, but also a beautifying effect of the unique visual appearance. For example, if the shoes or clothes of the pedestrians or children can emit light or glare with different colors, it can remind the driver of the existence of the pedestrians or children at night or in the dark to avoid accidents.

At present, the miniaturized light sources or LEDs are used by configuring the light emitting devices including LEDs or similar miniaturized light emitting components directly on wearable objects and personal belongings. The controlling circuit of the light emitting device is partially hided inside the wearable object, and the light emitting components controlled by the controlling circuit can be directly configured on the surface of the wearable object, under the light-transmitting surface of the wearable object, or inside the wearable object connected to the light-guiding component.

In the prior art, the motion conditions to drive the illumination, the illuminating effect, and the displayed pattern content of the illuminating device are preset inside the illuminating device before leaving the factory. However, it is difficult for the user to adjust the above conditions, special effects and contents except turning on or off the power. Therefore, it is necessary to develop an illuminating device and a wearable object allowing the wearer or user to remotely transmit and instantly change the message in convenient ways without directly giving commands to the controlling circuit and the storage in the device to solve the above problem.

In existing wearable objects with light emitting device, the light-emitting device usually includes a vibration sensor. Users can trigger the light emitting device to emit light by tapping, knocking and shaking. That is to say, the vibration sensor is a switch of the light emitting device. However, people may cause vibrations in wearable objects during their activities. Therefore, when the user does not need the light emitting function of the wearable object, it is very difficult for the user to avoid triggering the vibration sensor, thereby reducing the practicality. Especially, in the event there is an emergency situation in which the lighting is forbidden, the wearable objects only with vibration sensor may cause trouble and generate unwanted lighting in the emergency situation.

SUMMARY OF THE INVENTION

Therefore, the present invention provides a wearable object with light emitting device to solve the problems of the prior art.

According to an embodiment of the present invention, the wearable object includes a main body and a light emitting device. The main body includes a first containing space, a second containing space and an elastic structure. The first containing space is separated from the second containing space, and the elastic structure is corresponding to the second containing space. The light emitting device includes a plurality of light emitting units, a controlling unit and a switch module. The controlling unit is configured in the first containing space and electrically connected to the light emitting units. The controlling unit is configured to drive the light emitting units to emit light. The switch module is configured in the second containing space and electrically connected to the controlling unit. The switch module is configured to generate a controlling signal. Wherein, the switch module includes a substrate, a first metal sheet, a second metal sheet and an elastic sheet. The substrate includes a first surface and a second surface opposite to the first surface. The first metal sheet is configured on the first surface. The second metal sheet is configured on the first surface and located around the first metal sheet. The elastic sheet is configured over the first surface and including a fixing portion and a contacting portion. Wherein, the fixing portion is attached to the second metal sheet, and a gap is between the contacting portion and the first metal sheet. Wherein, when the elastic structure is pressed toward the second containing space to cause the contacting portion to contact the first metal sheet, the switch module sends the controlling signal to the controlling unit.

Wherein, the wearable object is a footwear. The main body of the footwear is a sole of the footwear, and the plurality of light emitting units includes a plurality of LEDs.

Wherein, the sole includes a side rib made of elastic material. The second containing space is formed within the side rib, and the elastic structure is a portion of the side rib facing to the second containing space.

Wherein, the main body further includes a channel space connected the first containing space to the second containing space, and a first set of wires connected between the controlling unit and the switch module are disposed into the channel space.

Wherein, the substrate includes a first pad and a second pad. The first pad is configured on the second surface and electrically connected to the first metal sheet, and the second pad is configured on the second surface and electrically connected to the second metal sheet.

Wherein, the controlling unit includes a circuit board electrically connected to the plurality of light emitting units, a motion sensor electrically connected to the circuit board, a controlling integrated circuit located on the circuit board, a battery disposed on the circuit board and electrically connected to the controlling integrated circuit and the plurality of light emitting units, and an anti-water case enclosing the circuit board, the motion sensor, the controlling integrated circuit and the battery. Wherein, a second set of wires extends from the circuit board to the plurality of light emitting units, and penetrates out of the anti-water cover.

Wherein, the motion sensor generates a vibrating signal according to an external force on the wearable object, and the controlling unit drives the plurality of light emitting units to emit light according to the vibrating signal.

Wherein, the controlling signal is a turn-on signal to turn on the controlling unit, or the controlling signal is a turn-off signal to turn off the controlling unit.

Wherein, the controlling integrated circuit includes a memory module storing a plurality of lighting modes. After the controlling unit receives the controlling signal, the controlling unit selects a first lighting mode from the plurality of lighting modes and optionally drives the plurality of light emitting units to emit light according to the first lighting mode.

Wherein, after the controlling unit selects the first lighting mode, the controlling unit further drives the plurality of light emitting units to emit light according to the first lighting mode when receiving the vibrating signal from the motion sensor.

Wherein, the substrate includes a fixing hole, and the elastic sheet includes a fixing pin extending from the fixing portion of the elastic sheet. The fixing pin penetrates through the fixing hole and is bent to attach to the second surface of the substrate.

Wherein, the wearable object further includes a protective case configured to encapsulate the switch module and fix the elastic sheet to the second metal sheet of the substrate.

Wherein, the protective case is made of thermoplastic material.

The present invention further provides a light emitting device for a wearable object including a plurality of light emitting unit, a controlling unit and a switch module. The controlling unit is electrically connected to the plurality of light emitting units. The controlling unit is configured to drive the light emitting units to emit light. The switch module is electrically connected to the controlling unit through a first set of wires. The switch module includes a substrate, a first metal sheet, a second metal sheet, an elastic sheet and a protective case. The substrate includes a first surface and a second surface opposite to the first surface. The first metal sheet is configured on the first surface. The second metal sheet is configured on the first surface and separated from the first metal sheet. The elastic sheet is configured over the first surface and including a fixing portion and a contacting portion. Wherein, the fixing portion is attached to the second metal sheet, and a gap is between the contacting portion and the first metal sheet. The protective case is configured to encapsulating the substrate and the elastic sheet. Wherein, the substrate includes a first fixing hole and a second fixing hole, and the elastic sheet includes a first fixing pin and a second fixing pin respectively extending from the fixing portion of the elastic sheet. The first fixing pin and the second fixing pin penetrate through the first fixing hole and the second fixing hole respectively, and are bent to attach to the second surface of the substrate.

Wherein, the protective case is made of thermoplastic material and configured to fix the elastic sheet to the second metal sheet of the substrate.

Wherein, when the contacting portion is pressed to contact the first metal sheet, the switch module sends a controlling signal to the controlling unit which optionally drives the plurality of light emitting units to emit light according to the controlling signal.

Wherein, the controlling unit includes a circuit board electrically connected to the plurality of light emitting units, a motion sensor electrically connected to the circuit board, a controlling integrated circuit located on the circuit board, a battery disposed on the circuit board and electrically connected to the controlling integrated circuit and the plurality of light emitting units, and an anti-water case enclosing the circuit board, the motion sensor, the controlling integrated circuit and the battery. Wherein, a second set of wires extends from the circuit board to the plurality of light emitting units, and penetrates out of the anti-water cover. Wherein, the motion sensor generates a vibrating signal according to an external force on the wearable object, and the controlling unit drives the plurality of light emitting units to emit light according to the vibrating signal.

Wherein, when the switch module is pressed more than a first predetermined period and then released, the switch module generate a turn-on signal to the controlling unit, such that the controlling unit is turned on and drives the plurality of light emitting units to flash according to a turn-on lighting mode; wherein when the switch module is pressed more than a second predetermined period and then released, the switch module generates a controlling signal to the controlling unit, such that the controlling unit selects a light mode corresponding the controlling signal and drives the plurality of light emitting units to flash according to the selected light mode, and then the controlling unit further drives the plurality of light emitting units to flash according to the selected light mode after the motion sensor sends the vibrating signal to the controlling integrated circuit; wherein when the switch module is pressed more than the first predetermined period again and then released, the switch module generates a turn-off signal to the controlling unit, such that the controlling unit drives the plurality of light emitting units to flash according to a turn-off lighting mode and then is turned off; wherein the first predetermined period is different from the second predetermined period.

Wherein, when the switch module is pressed, the switch module generate a turn-on signal to the controlling unit, such that the controlling unit is turned on and drives the plurality of light emitting units to flash according to a turn-on lighting mode; wherein when the controlling unit is turned on and then after the motion sensor sends the vibrating signal to the controlling integrated circuit, the controlling unit selects a light mode corresponding the vibrating signal and drives the plurality of light emitting units to flash according to the selected light mode; wherein when the switch module is pressed again, the switch module generates a turn-off signal to the controlling unit, such that the controlling unit drives the plurality of light emitting units to flash according to a turn-off lighting mode and then is turned off.

Wherein when the switch module is pressed, the switch module generate a turn-on signal to the controlling unit, such that the controlling unit is turned on and drives the plurality of light emitting units to flash according to a turn-on lighting mode; wherein when the controlling unit is turned on and then after the motion sensor sends a first vibrating signal to the controlling integrated circuit, the controlling unit selects a first light mode corresponding the first vibrating signal and drives the plurality of light emitting units to flash according to the first light mode; wherein when the controlling unit is turned on and then after the motion sensor sends a second vibrating signal to the controlling integrated circuit, the controlling unit selects a second light mode corresponding the first vibrating signal and drives the plurality of light emitting units to flash according to the second light mode; wherein when the switch module is pressed again, the switch module generates a turn-off signal to the controlling unit, such that the controlling unit drives the plurality of light emitting units to flash according to a turn-off lighting mode and then is turned off.

Wherein, when the switch module is pressed several time to generate a set of controlling signals sequentially, the set of controlling signals at least cause the control module: (1) to be turned on and optionally to drive the plurality of light emitting units to flash, (2) to drive the plurality of light emitting units to flash according to a first light mode, (3) to drive the plurality of light emitting units to flash according to a second light mode, and (4) to be turned off and optionally to drive the plurality of light emitting units to flash.

Wherein, when the switch module is continuously pressed more than a first predetermined period and then released, the switch module generates a turn-on signal to the controlling unit, such that the controlling unit is turned on and then drives the plurality of light emitting units to flash according to a turn-on lighting mode. Wherein, when the switch module is continuously pressed more than a second predetermined period and then released, the switch module generates a controlling signal to the controlling unit, such that the controlling unit selects a light mode corresponding to the controlling signal, and the controlling unit drives the plurality of light emitting units to flash according to the selected light mode. Wherein, when the switch module is pressed more than the first predetermined period again and then released, the switch module generates a turn-off signal to the controlling unit, such that the controlling unit drives the plurality of light emitting units to flash according to a turn-off lighting mode and then is turned off. Wherein, the first predetermined period is different from the second predetermined period.

In summary, the wearable object with light emitting device of the present invention can switch the light emitting units by the switch module according to the requirements of the user. Furthermore, the switch module of the present invention can be combined with the wearable object, the user can press the wearable object to trigger and control the light emitting units. Therefore, the wearable object with light emitting device of the present invention can stop emitting light when not in use, thereby avoiding unnecessary waste of power and increasing the practicality.

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 1:
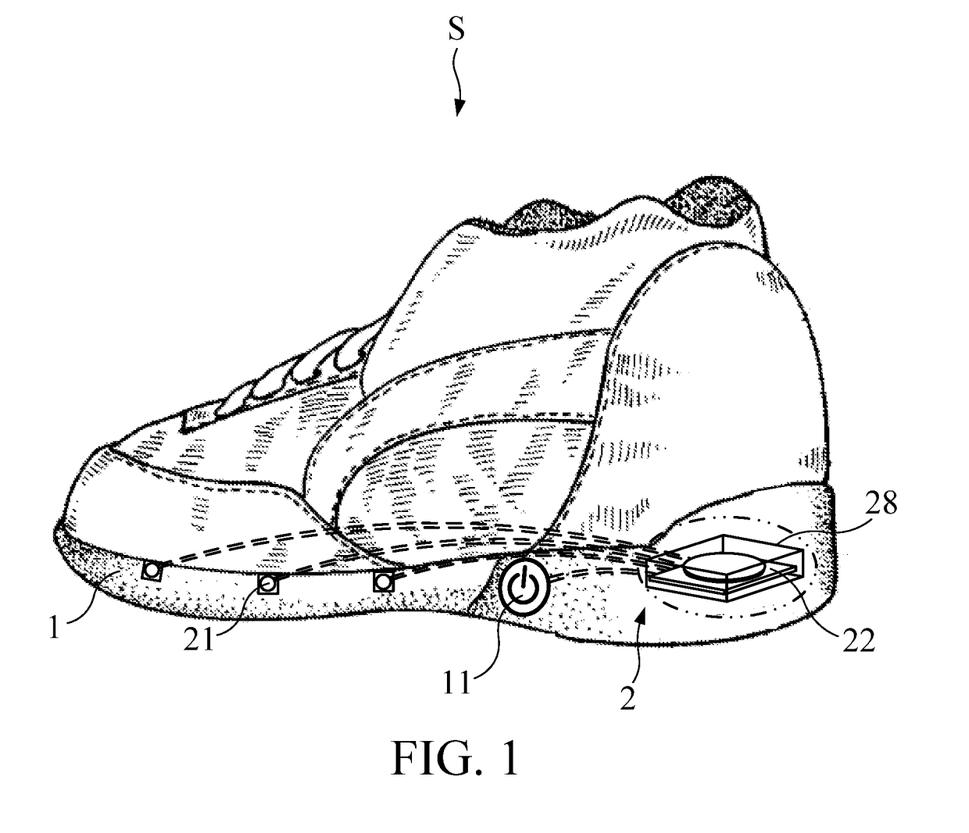
FIG. 1 is a schematic diagram illustrating a wearable object with light emitting device in an embodiment of the present invention.
Figure 2:
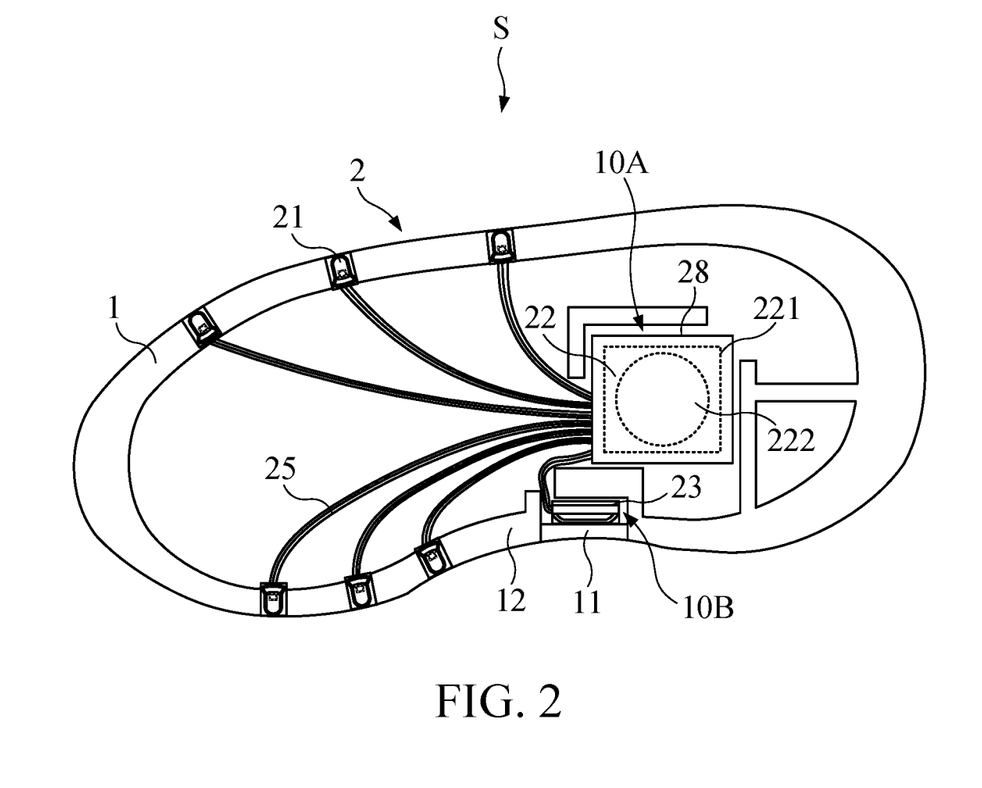
FIG. 2 is a sectional schematic diagram illustrating the wearable object with light emitting device of FIG. 1.
Figure 3:
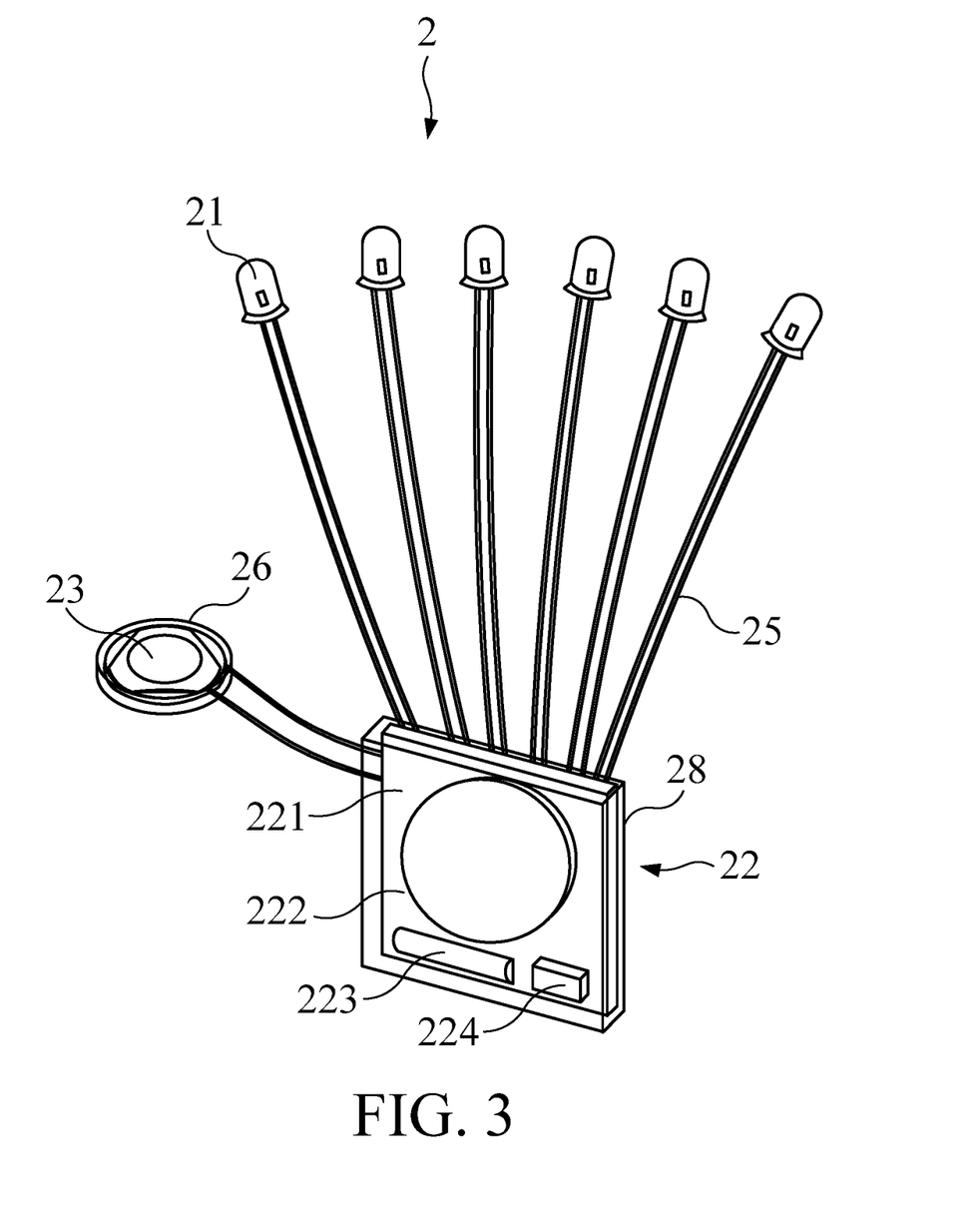
FIG. 3 is a structural schematic diagram illustrating the light emitting device in an embodiment of the present invention.

Please refer to FIG. 1, FIG. 2 and FIG. 3. FIG. 1 is a schematic diagram illustrating a wearable object with light emitting device S in an embodiment of the present invention. FIG. 2 is a sectional schematic diagram illustrating the wearable object with light emitting device S of FIG. 1. FIG. 3 is a structural schematic diagram illustrating the light emitting device 2 in an embodiment of the present invention. As shown in FIG. 1 and FIG. 2, in this embodiment, the wearable object with light emitting device S includes a main body 1 and a light emitting device 2. The light emitting device 2 is disposed in the main body 1 and configured for emitting light, so that the wearable object has light-emitting function. For example, the wearable object is a footwear, and the main body 1 is the sole of the footwear. Of course, the footwear further includes an upper or shoe cover which is disposed over the sole of the footwear.

In this embodiment, the main body 1 includes a first containing space 10A, a second containing space 10B and an elastic structure 11. The first containing space 10A is separated from the second containing space 10B, and the elastic structure 11 is corresponding to the second containing space 10B. In practice, the wearable object is a footwear or shoe, and the main body 1 is the sole of the footwear. Of course, the footwear further includes an upper or shoe cover which is disposed over the sole of the footwear. It should be noted that the present invention is not limited to applications in shoes or footwear, but can also be applied to other wearable items that can accommodate the light emitting device.

The elastic structure 11 is located at the sidewall of the main body 1. Moreover, the main body 1 includes a plurality of rib structures. The first containing space 10A can be arranged by the rib structures, or surrounded by surrounding the first containing space 10A, and the second containing space 10B can be arranged by the rib structures and the elastic structure 11. The elastic structure 11 can be pressed, and the material of the elastic structure 11 can be soft plastic material (such as rubber). When a user presses the elastic structure 11 from the outside toward the main body 1, the elastic structure 11 will move toward the second containing space 10B and the second containing space 10B will be decreased. In another embodiment, the main body 1 (such as sole of the shoe) includes a side rib 12 made of elastic material, and a cavity (such as the second containing space 10B) is formed within the side rib 12. When the user presses the elastic material from the outside of side rib 12 of the main body 1 (that is, the elastic structure 11 which is part of the side rib 12) corresponding to the second containing space 10B, the second containing space 10B will be shrunk as well.

As shown in FIG. 2 and FIG. 3, in this embodiment, the light emitting device 2 includes a plurality of light emitting units 21, a controlling unit 22 and a switch module 23. The controlling unit 22 is disposed in the first containing space 10A and electrically connected the light emitting units 21 and the switch module 23. The controlling unit 22 is configured to drive the light emitting units 21 to emit light. The switch module 23 is disposed in the second containing space 10B and configured to generate a controlling signal. Although the first containing space 10A is separated from the second containing space 10B, there is a channel space connected to the first containing space 10A and the second containing space 10B. The wires 25 connected to the controlling unit 22 and the switch module 23 could be disposed into the channel space.

In this embodiment, the controlling unit 22 includes a circuit board 221. The size of the circuit board 221 can be corresponding to the size of the first containing space 10A, and the size of the switch module 23 can be corresponding to the size of the second containing space 10B. In practice, the light emitting units 21 can be LED and disposed in the main body 1, on the surface of the main body 1, or on the surface of the wearable object (such as, the upper or cover of the footwear). In this embodiment, the light emitting device 2 includes six light emitting units 21, but it is not limited thereto. The number of the light emitting units can be determined according to the design or requirement.

The controlling unit 22 includes the circuit board 221, a battery 222 disposed on the circuit board 221, a motion sensor 223 electrically connected to the circuit board 221, and at least one controlling integrated circuit 224 is located on the circuit board 221. The battery 222 is configured to provide the power to the light emitting units 21 and other components on the circuit board 221. The controlling integrated circuit 224 includes a control module and a memory module which stores at least one lighting pattern or a plurality of lighting sequences. The memory module could be EPROM to be written by the manufacturer for the lighting pattern or the plurality of lighting sequences.

In this embodiment, the motion sensor 223 is configured to generate a vibrating signal, and the controlling integrated circuit 224 selectively drives the light emitting units 21 to emit light according to the vibrating signal. The motion sensor 223 can be a vibration sensor. When the motion sensor 223 detects the external force applied on the main body 1, the motion sensor 223 generates and sends the vibrating signal to the controlling integrated circuit 224. The controlling integrated circuit 224 can select one lighting pattern or lighting sequence to drives the light emitting units 21 to emit light. In practice, when the motion sensor 223 generates a first vibrating signal by detecting the external force at the first time, the controlling integrated circuit 224 drives the light emitting units 21 to emit light with the first lighting sequence. When the motion sensor 223 generates a second vibrating signal by detecting the external force again, the controlling integrated circuit 224 drives the light emitting units 21 to emit light with the second lighting sequence. The first lighting sequence may be the same as or different from the second lighting sequence.

Moreover, the motion sensor 223 can generate different vibrating signal according to the external force. The higher the vibrating frequency, the greater the external force. When the force value reaches to the first force threshold value, the motion sensor 223 generates the first vibrating signal, and then the controlling integrated circuit 224 drives the light emitting units 21 to emit light with the first lighting sequence. When the force value reaches to the second force threshold value, the motion sensor 223 generates the second vibrating signal, and then the controlling integrated circuit 224 drives the light emitting units 21 to emit light with the second lighting sequence, and so on.

Furthermore, the circuit board 221 (especially the controlling integrated circuit 224 on the circuit board 221) can be electrically connected the light emitting units 21 and the switch module 23 by wires 25. Therefore, the controlling unit 22 (especially the controlling integrated circuit 224 on the circuit board 221) can communicate with the light emitting units 21 and the switch module 23.

The controlling signal generated by the switch module 23 can be a light driving command. When the switch module 23 generates and sends the controlling signal to the controlling unit 22 or the controlling integrated circuit 224 on the circuit board 221, the controlling unit 22 or the controlling integrated circuit 224 on the circuit board 221 receives the controlling signal and selectively drives (such as, randomly or sequentially select one of lighting sequences stored in the memory module) the light emitting units 21 to emit light according to the controlling signal.

Figure 4A:
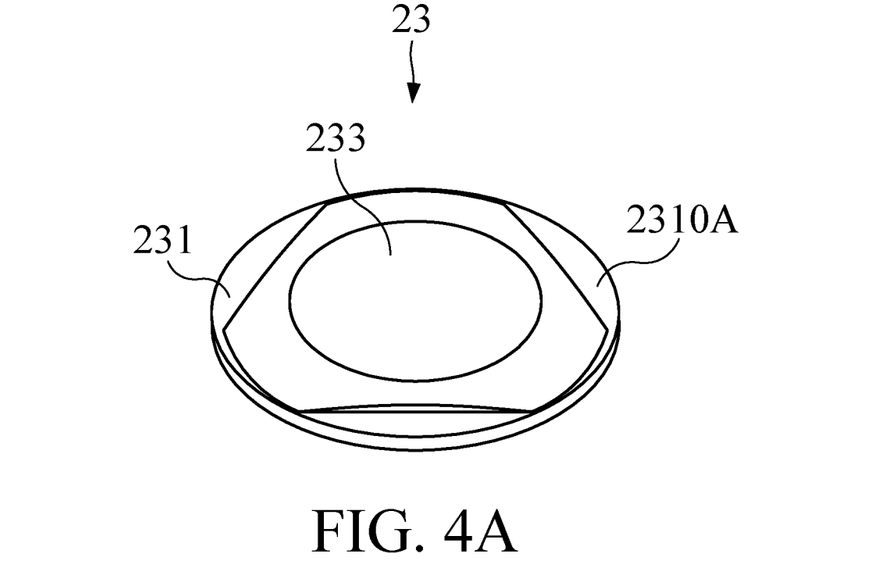
FIG. 4A is a structural diagram illustrating the switch module in FIG. 3.
Figure 4B:
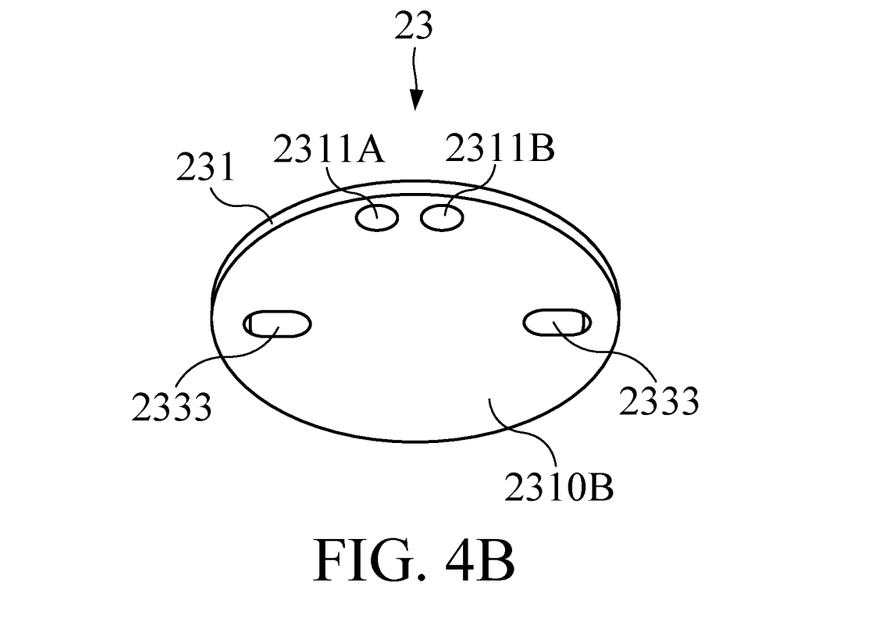
FIG. 4B is a structural diagram illustrating the switch module of FIG. 4A in another perspective view.
Figure 5A:
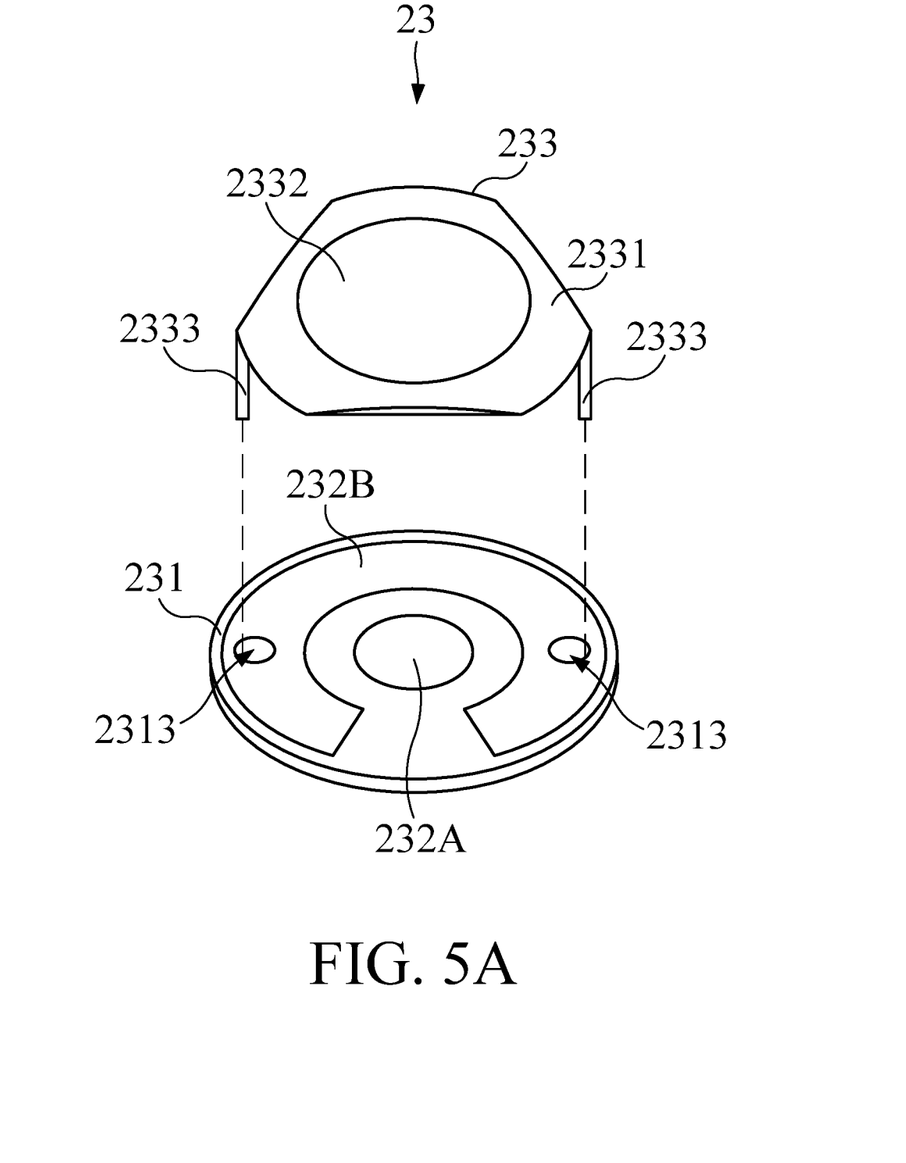
FIG. 5A is an exploded diagram illustrating the switch module in FIG. 3.

Please refer to FIG. 3, FIG. 4A, FIG. 4B, FIG. 5A and FIG. 5B. FIG. 4A is a structural diagram illustrating the switch module 23 in FIG. 3. FIG. 4B is a structural diagram illustrating the switch module 23 of FIG. 4A in another perspective view. FIG. 5A is an exploded diagram illustrating the switch module 23 in FIG. 3. As shown in FIG. 4A, FIG. 4B and FIG. 5A, in this embodiment, the switch module 23 includes a substrate 231, a first metal sheet 232A on the substrate 231, a second metal sheet 232B on the substrate 231, and an elastic sheet 233 over the substrate 231. The substrate 231 has a first surface 2310A and a second surface 2310B, and the first surface 2310A is opposite to the second surface 2310B. The first metal sheet 232A is disposed on the first surface 2310A. The second metal sheet 232B is disposed on the first surface 2310A and located around the first metal sheet 232A. The elastic sheet 233 is disposed over the first surface 2310A. In practice, the substrate 231 can be a circuit board. The first metal sheet 232A is configured on the middle of the first surface 2310A. The second metal sheet 232B is a ring shape sheet and configured around the first metal sheet 232A. The first metal sheet 232A and the second metal sheet 232B are not connected to each other.

In this embodiment, the elastic sheet 233 has a fixing portion 2331 and a contacting portion 2332. The fixing portion 2331 is fixed on the second metal sheet 232B. In practice, the size of the elastic sheet 233 can be corresponding to the size of the substrate 231. The contacting portion 2332 is located on the middle of the elastic sheet 233, and the fixing portion 2331 is located around the contacting portion 2332. That is to say, the position of the fixing portion 2331 is corresponding to the position of the second metal sheet 232B, and the position of the contacting portion 2332 is corresponding to the position of the first metal sheet 232A. Moreover, the elastic sheet 233 is a convex shape sheet, and the fixing portion 2331 and the contacting portion 2332 are located on different planes, for example, the contacting portion 2332 extends upward from the fixing portion 2331. When the elastic sheet 233 configured on the substrate 231, the fixing portion 2331 contacts or electrically connected to the second metal sheet 232B, however, a gap is formed between the contacting portion 2332 and the first metal sheet 232A.

In this embodiment, the elastic sheet 233 further includes two fixing pins 2333, and the substrate 231 further includes two fixing holes 2313. The position of the fixing pins 2333 are corresponding to the fixing holes 2313. The fixing pins 2333 are extended outward from the fixing portion 2331 of the elastic sheet 233, and the fixing pins 2333 and the fixing portion 2331 can be form in one piece. The fixing holes 2313 can be located on the position of the second metal sheet 232B, and the fixing holes 2313 are the through holes of the substrate 231. When elastic sheet 233 is installed over the substrate 231, the fixing pins 2333 of the elastic sheet 233 can pass through the fixing holes 2313 and engage on the substrate 231. At this time, the fixing portion 2331 contacts the second metal sheet 232B, but there is a gap is formed between the contacting portion 2332 and the first metal sheet 232A.

In another embodiment, the substrate 231 further includes a first pad 2311A and a second pad 2311B. The first pad 2311A and the second pad 2311B are disposed on the second surface 2310B of the substrate 231. The first pad 2311A is electrically connected to the first metal sheet 232A, and the second pad 2311B is electrically connected to the second metal sheet 232B. The first pad 2311A and the second pad 2311B are not connected to each other. The first pad 2311A and the second pad 2311B are electrically connected to the controlling unit 22 by wires 25 respectively. Furthermore, in another embodiment, the first pad 2311A is connected to the positive pole of the battery 222, and the second pad 2311B is connected to the negative pole of the battery 222. That is to say, the first metal sheet 232A is connected to the positive pole of the battery 222, and the second metal sheet 232B is connected to the negative pole of the battery 222. In practice, when the contacting portion 2332 contacts the first metal sheet 232A, the first pad 2311A, the first metal sheet 232A, the second metal sheet 232B, the second pad 2311B form a closed circuit (that is, the switch module 23 in conduction state or trigger state). At this time, the switch module 23 generates the controlling signal.

Moreover, in this embodiment, the light emitting device 2 further includes an anti-water case 28 for covering the controlling unit 22 and a protective case 26 enclosing the switch module 23. As shown in FIG. 3, the anti-water case 28 can cover the circuit board 221, the battery 222 and other controlling components disposed on the circuit board 221. Similarly, the size of the protective case 26 can be corresponding to the size of the switch module 23. In practice, the material of the protective case 26 or the anti-water case 28 can be polyethylene (PE), polypropylene (PP), Polyvinyl chloride (PVC), or other insulating soft materials. In one embodiment, the anti-water case 28 covering the controlling unit 22 is the insulating hard material, and the protective case 26 covering the switch module is the insulating soft material.

Figure 5B:
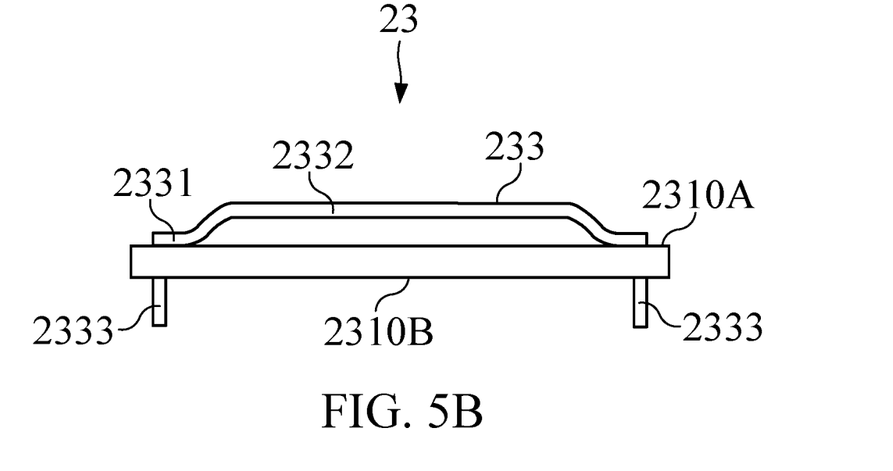
FIG. 5B and FIG. 5C are structural diagrams illustrating the switch module during assembly.
Figure 5C:
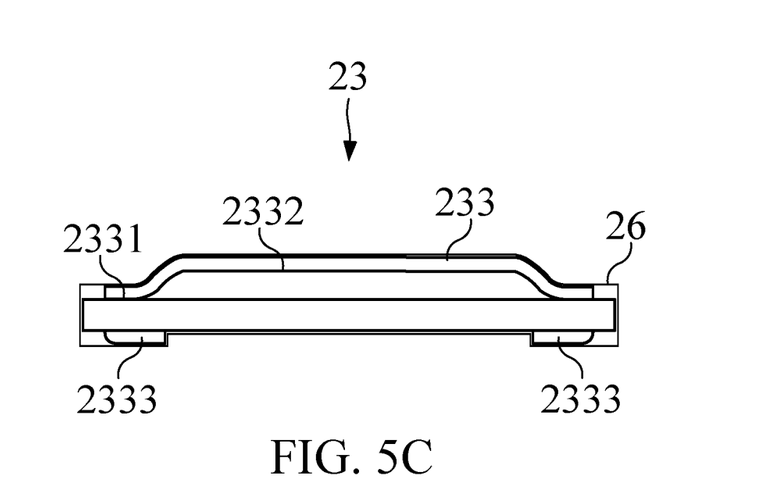

Please refer to FIG. 5A, FIG. 5B and FIG. 5C. FIG. 5B and FIG. 5C are structural diagrams illustrating the switch module 23 during assembly. In this embodiment, the first metal sheet 232A and the second metal sheet 232B are configured on the first surface 2310A, and the first pad 2311A and the second pad 2311B are configured on the second surface 2310B. As shown in FIG. 5B, when the elastic sheet 233 is installed on the substrate 231, the fixing pins 2333 of the elastic sheet 233 can pass through the fixing holes 2313 from the first surface 2310A and protrude from the second surface 2310B. Then, as shown in FIG. 5C, the fixing pins 2333 will be bent and attached to the second surface 2310B. Then, the protective case 26 can encapsulate the elastic sheet 233 and the substrate 231. In practice, the protective case 26 can be a thermoplastic material, such as heat shrink tube. When the protective case 26 is heated, the fixing pins 2333 will be tightly attached to the second surface 2310B, and the fixing portion 2331 will be tightly attached to the second metal sheet 232B, so that the elastic sheet 233 can be fixed on the substrate 231 without additional welding. It is should be noted that there is still a gap formed between the contacting portion 2332 and the first metal sheet 232A after heating the protective case 26.

Please refer to FIG. 2, FIG. 4A and FIG. 5A. In this embodiment, when the switch module 23 is disposed in the second containing space 10B, the elastic sheet 233 is face to the elastic structure 11, and the contacting portion 2332 of the elastic sheet 233 is corresponding to the elastic structure 11. Therefore, when the user presses the elastic structure 11 from the outside toward the main body 1, the elastic structure 11 will push the contacting portion 2332 inward and drive the contacting portion 2332 to contact the first metal sheet 232A.

Figure 6A:
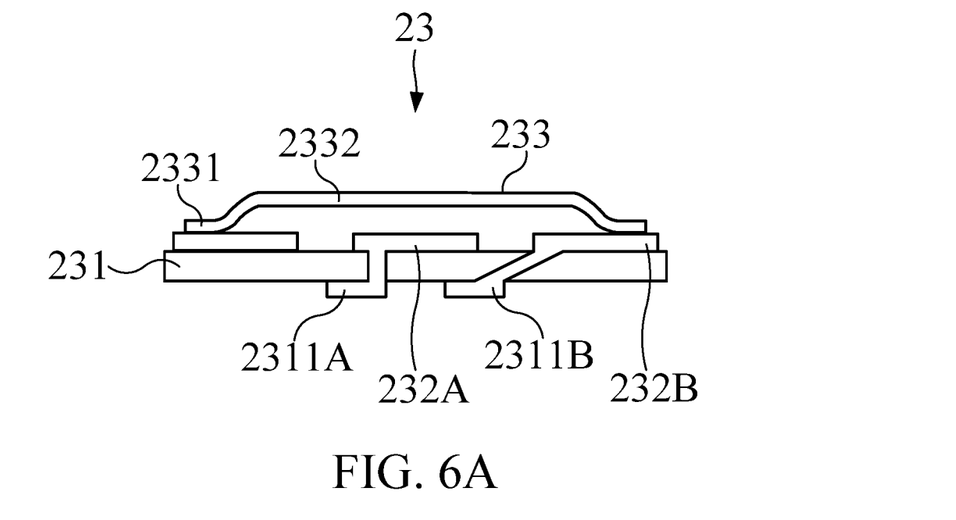
FIG. 6A is a sectional diagram illustrating the switch module of FIG. 3.
Figure 6B:
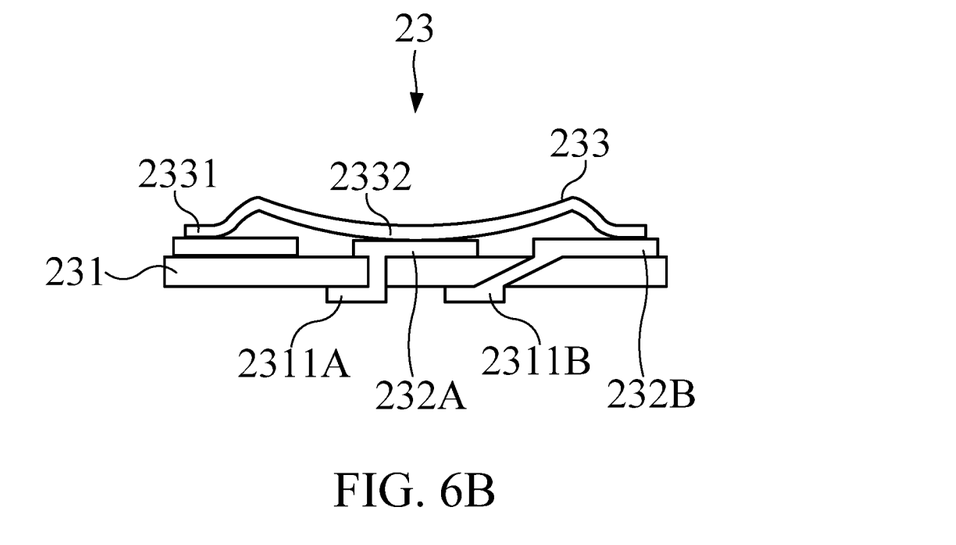
FIG. 6B is a sectional diagram illustrating the switch module in trigger state of FIG. 6A.

Please refer to FIG. 3, FIG. 6A and FIG. 6B. FIG. 6A is a sectional diagram illustrating the switch module 23 of FIG. 3. FIG. 6B is a sectional diagram illustrating the switch module 23 in trigger state of FIG. 6A. FIG. 6A is the switch module 23 in non-trigger state. In practice, as shown in FIG. 6A, when the switch module 23 is in non-trigger state, the contacting portion 2332 of the elastic sheet 233 does not contact the first metal sheet 232A. At this time, the elastic sheet 233 is in the open circuit state, and the elastic sheet 233 will not generate the controlling signal. As shown in FIG. 6B, when the user presses the elastic structure 11, the contacting portion 2332 will be driven by the elastic structure 11 and move toward the substrate 231 to contact the first metal sheet 232A. At this time, the elastic sheet 233 is in the closed circuit state, and the elastic sheet 233 will generate the controlling signal.

In another embodiment, when the switch module 23 will send a controlling signal (or send a controlling signal set when the switch module 23 is pressed or triggered several times) to the controlling unit 22, and the controlling unit 22 can pre-store a lighting mode set. The controlling signal set includes a plurality of controlling signals, and the lighting mode set includes a plurality of lighting modes. The number of the controlling signals can be the same as the number of the lighting modes, and the lighting modes can be corresponding to the controlling signals respectively. For example, when the switch module 23 is pressed, it will send a first controlling signal to the controlling unit 22; when the switch module 23 is pressed again, it will send a second controlling signal to the controlling unit 22; when the switch module 23 is further pressed, it will send a third controlling signal to the controlling unit 22, and so on. The controlling signal set could comprise the first, the second, and the third controlling signals. In practice, the switch module 23 can generate and send those controlling signals sequentially.

Furthermore, the first controlling signal is corresponding to the first lighting mode of the lighting mode set, and the second controlling signal is corresponding to the second lighting mode of the lighting mode set, and so on. The controlling unit 22 also drives the light emitting units 21 to emit light according to the first light mode when the user press the elastic structure 11 at the first time, and controlling unit 22 drives the light emitting units 21 to emit light according to the second light mode when the user press the elastic structure 11 at the second time, and so on. In the event there are 3 light modes stored in the controlling unit 22, the controlling unit 22 will drives the light emitting units 21 to emit light according to the first to third light mode when it respectively receives the fourth to sixth controlling signals from the switch module 23, and so on.

In one embodiment, the wires connected to the plurality of LEDs (such as, six light emitting units) have different lengths, respectively. The first light emitting unit is connected to the controlling unit with the shortest wires, and the sixth light emitting unit is connected to the controlling unit with the longest wires. When the controlling unit receives the controlling signal and controls the light emitting units with the flashing sequence, the flashing order of the light emitting units can be from the first light emitting unit to the sixth light emitting unit. That is to say, the flashing order of the light emitting units can be from the light emitting unit with the shortest wires to the light emitting unit with the longest wires. In one embodiment, the flashing order of the light emitting units can also be from the light emitting unit with the longest wires to the light emitting unit with the shortest wires.

The lighting modes can include at least one lighting color, a flashing frequency, duration of the lighting mode, and flashing sequence, etc. In practice, the lighting mode or sequence can be that, lighting the first light emitting unit to the sixth light emitting unit sequentially to form a lighting cycle, and then repeats the lighting cycle with N times, wherein the N is a natural number. In one embodiment, the lighting mode or sequence can be that the first light emitting unit to the sixth light emitting unit light or flash sequentially and light reversely to form a lighting cycle, and repeats the lighting cycle with N times, wherein the N is a natural number. In one embodiment, the lighting mode or sequence can be for the first light emitting unit to the sixth light emitting unit to light or flash sequentially once and light simultaneously with N times, wherein the N is a natural number. In one embodiment, the lighting mode can be that, the first light emitting unit to the sixth light emitting unit to light sequentially with a first frequency, and then those light emitting units light or flash sequentially with a gradually changed frequency, and the gradually changed frequency can be gradually faster or gradually slower frequency. In one embodiment, the lighting mode can be that, two light emitting units flash twice, then other two light emitting units flash twice, and so on. For example, the second light emitting unit and fifth light emitting unit simultaneously light twice at first; then, the first light emitting unit and fourth light emitting unit simultaneously light twice; finally, the third light emitting unit and sixth light emitting unit simultaneously light twice.

Moreover, the controlling signal also can include turn-on signal and turn-off signal. That is, the controlling signal generated by the switch module 23 can be a ON/OFF command to turn on or turn off the controlling unit 22. When the switch module 23 is pressed once, the power of the controlling unit 22 is turned off, and it will not response to any vibrating signal from the motion sensor 223. When the switch module 23 is pressed again, the power of the controlling unit 22 is then turned on, and it will be active and response to the vibrating signal from the motion sensor 223 to drive the LEDs.

In another example, the order of the controlling signals of the controlling signal set can be the turn-on signal, the first controlling signal, the second controlling signal, the third controlling signal and the turn-off signal. For example, when the user presses the elastic structure 11 or the switch module 23 several time to generate several controlling signals sequentially, those several controlling signals sequentially sent to the control module 22 could be in the following orders and cause the control module 22: (1) to be turned on (and optionally emit light to notice the ON status, such as simultaneous flash all LEDs twice), (2) to drive LEDs with the first light mode, (3) to drive LEDs with the second light mode, (4) to drive LEDs with the third light mode, and then (5) to be turned off (and optionally emit light to notice the OFF status, such as simultaneous flash all LEDs twice). Additionally, the controlling unit 22 can drive the light emitting units 21 to emit light according to the switch module 23 and the aforementioned motion sensor 223. For example, after the controlling unit 22 drives LEDs with the first light mode according the aforesaid order (2), in the event the aforementioned motion sensor 223 further sends the vibrating signal to the controlling unit 22, the controlling unit 22 will drive LEDs to light with the first light mode. Similarly, after the controlling unit 22 drives LEDs with the second light mode according the aforesaid order (3), in the event the aforementioned motion sensor 223 further sends the vibrating signal to the controlling unit 22, the controlling unit 22 will drive LEDs to light with the second light mode.

In one embodiment, different contact periods of the switch module 23 will correspond to different controlling signal, respectively. For example, if the contact period is 1 second, the switch module 23 generates a first controlling signal; if the contact period is 2 second, the switch module 23 generates a second controlling signal, and so on. Then, after receiving different controlling signal, the controlling unit 22 will selectively drive the LEDs according to different corresponding lighting sequence. Alternatively, the controlling unit 22 can drive the light emitting units 21 to emit light according to the switch module 23 and the aforementioned motion sensor 223. That is, the switch module 23 will send, based on the press of the switch module 23, different controlling signal to the controlling unit 22 which then can select different lighting sequence. Then, the controlling unit 22 will drive the light emitting units 21 to flash according to the selected lighting sequence after receiving the vibrating signal from the aforementioned motion sensor 223.

In another example, the controlling signal can be determined by the trigger time length of the switch module 23. The trigger time length can be the contacting period of the contacting portion 2332 and the first metal sheet 232A. In practice, when the user continuously presses the elastic structure or the switch module 23 over a first predetermined period (such as, 2 seconds), the switch module 23 will send the turn-on signal to the controlling unit 22 which is then active (at the same time it is optionally the controlling unit 22 may drive the light emitting units 21 to flash simultaneously in order to notice the turn on status). Furthermore, every time when the user presses the elastic structure or the switch module 23 with a second predetermined period (such as, 1 second or less than 1 second), the switch module 23 will send the controlling signal which corresponds to different light mode to the controlling unit 22, and the controlling unit 22 drives the light emitting units 21 to emit light based on the corresponding lighting mode. That is, the first controlling signal (when the user presses the elastic structure with a second predetermined period) is corresponding to the first lighting mode, and the second controlling signal (when the user presses the elastic structure with a second predetermined period again) is corresponding to the second lighting mode, and so on. Then, when the user continuously presses the elastic structure with the first predetermined period again, the switch module 23 will send the turn-off signal to the controlling unit 22, and the controlling unit 22 will be turned off (and at the same time it is optionally the controlling unit 22 will drive the light emitting units 21 to flash simultaneously in order to notice the turn off status and the be inactive). The first predetermined period is different from the second predetermined period.

That is, when the user continuously presses the switch module 23 more than the first predetermined period and then releases, it will generate the turn-on signal and the controlling unit 22 is turned on and optionally drives the light emitting units 21 according to the preset turn-on lighting mode. When the user continuously presses the switch module 23 more than the second predetermined period and then releases, it will generate a controlling signal and the controlling unit 22 selects the light mode corresponding the controlling signal, and later on the controlling unit 22 drives the light emitting units 21 based on the selected light mode. When the user presses the switch module 23 with the first predetermined period and then releases again, it will generate the turn-off signal and the controlling unit 22 is turned off and optionally drives the light emitting units 21 according to the preset turn-off lighting mode. It should be noted that the controlling unit 22 will not receive the vibrating signal after turning off the controlling unit 22.

Moreover, the controlling unit 22 can drive the light emitting units 21 to emit light according to the switch module 23 and the aforementioned motion sensor 223. For example, when the user presses the elastic structure or switch module 23 over a first predetermined period (such as, 2 seconds), the switch module 23 will send the turn-on signal to the controlling unit 22 which is then active (and at the same time it is optionally the controlling unit 22 may drive the light emitting units 21 to flash simultaneously in order to notice the turn on status). Furthermore, every time when the user presses the elastic structure or switch module 23 with a second predetermined period (such as, 1 second or less than 1 second), the switch module 23 will send different controlling signal which corresponds to different light mode to the controlling unit 22, and the controlling unit 22 will select the corresponding lighting mode from the memory based on different controlling signal. That is, the first controlling signal (when the user presses the elastic structure or the switch module 23 over a second predetermined period) is corresponding to the first selected lighting mode, and the second controlling signal (when the user presses the elastic structure or the switch module 23 over a second predetermined period again) is corresponding to the second selected lighting mode, and so on. Afterward, when the aforementioned motion sensor 223 sends the vibrating signal to the controlling unit 22, the controlling unit 22 will drive the light emitting units 21 to emit light based on the selected lighting mode. Finally, when the user continuously presses the elastic structure with the first predetermined period again, the switch module 23 will send the turn-off signal to the controlling unit 22, and the controlling unit 22 will be turned off (and at the same time it is optionally the controlling unit 22 will drive the light emitting units 21 to flash simultaneously in order to notice the turn off status and the be inactive)

That is, when the user presses the switch module 23 over the first predetermined period and then releases to generate the turn-on signal, the controlling unit 22 is turned on and optionally drives the light emitting units 21 according to the preset turn-on lighting mode. When the user presses the switch module 23 over the second predetermined period and then releases to generate a controlling signal, the controlling unit 22 selects the light mode corresponding the controlling signal (and optionally the controlling unit 22 may first drive LEDs to flash according to the selected light mode for notice purpose), and then the controlling unit 22 drives the light emitting units 21 according to the selected light mode based on the vibrating signal from the aforementioned motion sensor 223. When the user presses the switch module 23 over the first predetermined period and then releases again to generate the turn-off signal, the controlling unit 22 is turned off and optionally drives the light emitting units 21 according to the preset turn-off lighting mode. It should be noted that the controlling unit 22 will not receive the vibrating signal after turning off the controlling unit 22.

In summary, the wearable object with light emitting device of the present invention can switch the light emitting units according to the requirements of the user. Furthermore, the switch module is embedded into the side rib of the wearable object and covered by elastic material. Thus, the user can press the elastic material of the wearable object to push the switch module and then to trigger and control the light emitting units. Therefore, the wearable object with light emitting device of the present invention can stop emitting light when not in use, thereby avoiding unnecessary waste of power and increasing the practicality.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wearable object comprising:
   a main body, comprising a first containing space, a second containing space and an elastic structure, the first containing space being separated from the second containing space, and the elastic structure being corresponding to the second containing space; and
   a light emitting device, comprising:
      a plurality of light emitting units;
      a controlling unit, positioned in the first containing space and electrically connected to the light emitting units, the controlling unit being configured to drive the light emitting units to emit light; and
      a switch module, positioned in the second containing space and electrically connected to the controlling unit, the switch module being configured to generate a controlling signal;
      wherein, the switch module comprises:
         a substrate, including a first surface and a second surface opposite to the first surface;
         a first metal sheet on the first surface;
         a second metal sheet on the first surface; and
         an elastic sheet positioned over the first surface and including a fixing portion and a contacting portion, wherein the fixing portion is attached to the second metal sheet, and a gap is between the contacting portion and the first metal sheet;
   wherein, when the elastic structure is pressed toward the second containing space to cause the contacting portion to contact the first metal sheet, the switch module sends the controlling signal to the controlling unit.

2. The wearable object of claim 1, wherein the wearable object is a footwear, the main body of the footwear is a sole of the footwear, and the plurality of light emitting units comprises a plurality of LEDs.

3. The wearable object of claim 2, wherein the sole comprises a side rib made of elastic material, the second containing space is formed within the side rib, and the elastic structure is a portion of the side rib facing to the second containing space.

4. The wearable object of claim 2, wherein the main body further comprises a channel space connected the first containing space to the second containing space, and a first set of wires connected between the controlling unit and the switch module are disposed into the channel space.

5. The wearable object of claim 1, wherein the substrate comprises a first pad and a second pad, the first pad is configured on the second surface and electrically connected to the first metal sheet, and the second pad is configured on the second surface and electrically connected to the second metal sheet.

6. The wearable object of claim 1, wherein the controlling unit comprises:
a circuit board, electrically connected to the plurality of light emitting units;
a motion sensor, electrically connected to the circuit board;
a controlling integrated circuit, located on the circuit board;
a battery, disposed on the circuit board and electrically connected to the controlling integrated circuit and the plurality of light emitting units; and
an anti-water case, enclosing the circuit board, the motion sensor, the controlling integrated circuit and the battery, wherein a second set of wires extends from the circuit board to the plurality of light emitting units, and penetrates out of the anti-water cover.

7. The wearable object of claim 6, wherein the motion sensor generates a vibrating signal according to an external force on the wearable object, and the controlling unit drives the plurality of light emitting units to emit light according to the vibrating signal.

8. The wearable object of claim 7, wherein the controlling signal is a turn-on signal to turn on the controlling unit, or the controlling signal is a turn-off signal to turn off the controlling unit.

9. The wearable object of claim 7, wherein the controlling integrated circuit comprises a memory module storing a plurality of lighting modes, after the controlling unit receives the controlling signal, the controlling unit selects a first lighting mode from the plurality of lighting modes and drives the plurality of light emitting units to emit light according to the first lighting mode.

10. The wearable object of claim 9, wherein after the controlling unit selects the first lighting mode, the controlling unit further drives the plurality of light emitting units to emit light according to the first lighting mode when receiving the vibrating signal from the motion sensor.

11. The wearable object of claim 1, wherein the substrate comprises a fixing hole, and the elastic sheet comprises a fixing pin extending from the fixing portion of the elastic sheet, the fixing pin penetrates through the fixing hole and is bent to attach to the second surface of the substrate.

12. The wearable object of claim 11, further comprising a protective case configured to encapsulate the switch module and fix the elastic sheet to the second metal sheet of the substrate.

13. The wearable object of claim 11, wherein the protective case is made of thermoplastic material.

14. A light emitting device for a wearable object, comprising:
a plurality of light emitting units;
a controlling unit, electrically connected to the plurality of light emitting units, the controlling unit configured to drive the light emitting units to emit light; and
a switch module, electrically connected to the controlling unit through a first set of wires; wherein the switch module comprises:
a substrate, including a first surface and a second surface opposite to the first surface;
a first metal sheet on the first surface;
a second metal sheet on the first surface and physically separated from the first metal sheet;
an elastic sheet over the first surface and including a fixing portion and a contacting portion, wherein the fixing portion is attached to the second metal sheet, and a gap is between the contacting portion and the first metal sheet; and
a protective case encapsulating the substrate and the elastic sheet;
wherein, the substrate comprises a first fixing hole and a second fixing hole, and the elastic sheet comprises a first fixing pin and a second fixing pin respectively extending from the fixing portion of the elastic sheet, the first fixing pin and the second fixing pin penetrate through the first fixing hole and the second fixing hole respectively, and are bent to attach to the second surface of the substrate.

15. The light emitting device of claim 14, wherein the protective case is made of thermoplastic material and configured to fix the elastic sheet to the second metal sheet of the substrate.

16. The light emitting device of claim 14, wherein when the contacting portion is pressed to contact the first metal sheet, the switch module sends a controlling signal to the controlling unit which optionally drives the plurality of light emitting units to emit light according to the controlling signal.

17. The light emitting device of claim 14, wherein the controlling unit comprises:
a circuit board, electrically connected to the plurality of light emitting units;
a motion sensor, electrically connected to the circuit board;
a controlling integrated circuit, located on the circuit board;
a battery, disposed on the circuit board and electrically connected to the controlling integrated circuit and the plurality of light emitting units; and
an anti-water case enclosing the circuit board, the motion sensor, the controlling integrated circuit and the battery; wherein a second set of wires extends from the circuit board to the plurality of light emitting units, and penetrates out of the anti-water cover;
wherein, the motion sensor generates a vibrating signal according to an external force on the wearable object, and then send the vibrating signal to the controlling integrated circuit.

18. The light emitting device of claim 17, wherein when the switch module is pressed more than a first predetermined period and then released, the switch module generate a turn-on signal to the controlling unit, such that the controlling unit is turned on and drives the plurality of light emitting units to flash according to a turn-on lighting mode; wherein when the switch module is pressed more than a second predetermined period and then released, the switch module generates a controlling signal to the controlling unit, such that the controlling unit selects a light mode corresponding the controlling signal and drives the plurality of light emitting units to flash according to the selected light mode, and then the controlling unit further drives the plurality of light emitting units to flash according to the selected light mode after the motion sensor sends the vibrating signal to the controlling integrated circuit; wherein when the switch module is pressed more than the first predetermined period again and then released, the switch module generates a turn-off signal to the controlling unit, such that the controlling unit drives the plurality of light emitting units to flash according to a turn-off lighting mode and then is turned off; wherein the first predetermined period is different from the second predetermined period.

19. The light emitting device of claim 17, wherein when the switch module is pressed, the switch module generate a turn-on signal to the controlling unit, such that the controlling unit is turned on and drives the plurality of light emitting units to flash according to a turn-on lighting mode; wherein when the controlling unit is turned on and then after the motion sensor sends the vibrating signal to the controlling integrated circuit, the controlling unit selects a light mode corresponding the vibrating signal and drives the plurality of light emitting units to flash according to the selected light mode; wherein when the switch module is pressed again, the switch module generates a turn-off signal to the controlling unit, such that the controlling unit drives the plurality of light emitting units to flash according to a turn-off lighting mode and then is turned off.

20. The light emitting device of claim 14, wherein when the switch module is pressed several time to generate a set of controlling signals sequentially, the set of controlling signals at least cause the control module: (1) to be turned on and optionally to drive the plurality of light emitting units to flash, (2) to drive the plurality of light emitting units to flash according to a first light mode, (3) to drive the plurality of light emitting units to flash according to a second light mode, and (4) to be turned off and optionally to drive the plurality of light emitting units to flash.

21. The light emitting device of claim 14, wherein when the switch module is pressed more than a first predetermined period and then released, the switch module generates a turn-on signal to the controlling unit, such that the controlling unit is turned on and then drives the plurality of light emitting units to flash according to a turn-on lighting mode; wherein when the switch module is pressed more than a second predetermined period and then released, the switch module generates a controlling signal to the controlling unit, such that the controlling unit selects a light mode corresponding to the controlling signal, and the controlling unit drives the plurality of light emitting units to flash according to the selected light mode; wherein when the switch module is pressed more than the first predetermined period again and then released, the switch module generates a turn-off signal to the controlling unit, such that the controlling unit drives the plurality of light emitting units to flash according to a turn-off lighting mode and then is turned off; wherein the first predetermined period is different from the second predetermined period.

22. A light emitting device for a wearable object, comprising:
a plurality of light emitting units;
a controlling unit, electrically connected to the plurality of light emitting units, the controlling unit configured to drive the light emitting units to emit light; and
a switch module, electrically connected to the controlling unit through a first set of wires; wherein the switch module comprises:
a substrate, including a first surface and a second surface opposite to the first surface;
a first metal sheet on the first surface;
a second metal sheet on the first surface and physically separated from the first metal sheet; and
an elastic sheet over the first surface and including a fixing portion and a contacting portion, wherein the fixing portion is attached to the second metal sheet, and a gap is between the contacting portion and the first metal sheet;
wherein, the substrate comprises a first fixing hole and a second fixing hole, and the elastic sheet comprises a first fixing pin and a second fixing pin respectively extending from the fixing portion of the elastic sheet, the first fixing pin and the second fixing pin penetrate through the first fixing hole and the second fixing hole respectively, and are bent to attach to the second surface of the substrate.

23. The light emitting device of claim 22, wherein the switch module comprises a protective case encapsulating the substrate and the elastic sheet, and the protective case is made of thermoplastic material.

24. The light emitting device of claim 22, wherein the controlling unit comprises:
a circuit board, electrically connected to the plurality of light emitting units;
a motion sensor, electrically connected to the circuit board;
a controlling integrated circuit, located on the circuit board;
a battery, disposed on the circuit board and electrically connected to the controlling integrated circuit and the plurality of light emitting units; and
an anti-water case enclosing the circuit board, the motion sensor, the controlling integrated circuit and the battery; wherein a second set of wires extends from the circuit board to the plurality of light emitting units, and penetrates out of the anti-water cover;
wherein, the motion sensor generates a vibrating signal according to an external force on the wearable object, and then send the vibrating signal to the controlling integrated circuit.

25. The light emitting device of claim 24, wherein when the switch module is pressed more than a first predetermined period and then released, the switch module generate a turn-on signal to the controlling unit, such that the controlling unit is turned on and drives the plurality of light emitting units to flash according to a turn-on lighting mode; wherein when the switch module is pressed more than a second predetermined period and then released, the switch module generates a controlling signal to the controlling unit, such that the controlling unit selects a light mode corresponding the controlling signal and drives the plurality of light emitting units to flash according to the selected light mode, and then the controlling unit further drives the plurality of light emitting units to flash according to the selected light mode after the motion sensor sends the vibrating signal to the controlling integrated circuit; wherein when the switch module is pressed more than the first predetermined period again and then released, the switch module generates a turn-off signal to the controlling unit, such that the controlling unit drives the plurality of light emitting units to flash according to a turn-off lighting mode and then is turned off; wherein the first predetermined period is different from the second predetermined period.

26. The light emitting device of claim 24, wherein when the switch module is pressed, the switch module generate a turn-on signal to the controlling unit, such that the controlling unit is turned on and drives the plurality of light emitting units to flash according to a turn-on lighting mode;

wherein when the controlling unit is turned on and then after the motion sensor sends the vibrating signal to the controlling integrated circuit, the controlling unit selects a light mode corresponding the vibrating signal and drives the plurality of light emitting units to flash according to the selected light mode; wherein when the switch module is pressed again, the switch module generates a turn-off signal to the controlling unit, such that the controlling unit drives the plurality of light emitting units to flash according to a turn-off lighting mode and then is turned off.

27. The light emitting device of claim 22, wherein when the switch module is pressed, the switch module generate a turn-on signal to the controlling unit, such that the controlling unit is turned on and drives the plurality of light emitting units to flash according to a turn-on lighting mode; wherein when the controlling unit is turned on and then after the motion sensor sends a first vibrating signal to the controlling integrated circuit, the controlling unit selects a first light mode corresponding the first vibrating signal and drives the plurality of light emitting units to flash according to the first light mode; wherein when the controlling unit is turned on and then after the motion sensor sends a second vibrating signal to the controlling integrated circuit, the controlling unit selects a second light mode corresponding the first vibrating signal and drives the plurality of light emitting units to flash according to the second light mode; wherein when the switch module is pressed again, the switch module generates a turn-off signal to the controlling unit, such that the controlling unit drives the plurality of light emitting units to flash according to a turn-off lighting mode and then is turned off.

28. The light emitting device of claim 22, wherein when the switch module is pressed more than a first predetermined period and then released, the switch module generates a turn-on signal to the controlling unit, such that the controlling unit is turned on and then drives the plurality of light emitting units to flash according to a turn-on lighting mode; wherein when the switch module is pressed more than a second predetermined period and then released, the switch module generates a controlling signal to the controlling unit, such that the controlling unit selects a light mode corresponding to the controlling signal, and the controlling unit drives the plurality of light emitting units to flash according to the selected light mode; wherein when the switch module is pressed more than the first predetermined period again and then released, the switch module generates a turn-off signal to the controlling unit, such that the controlling unit drives the plurality of light emitting units to flash according to a turn-off lighting mode and then is turned off; wherein the first predetermined period is different from the second predetermined period.

* * * * *